United States Patent
Kinugasa et al.

(10) Patent No.: US 9,870,015 B2
(45) Date of Patent: Jan. 16, 2018

(54) ENERGY CONTROL DEVICE AND ENERGY CONTROL SYSTEM EQUIPPED WITH THE ENERGY CONTROL DEVICE

(71) Applicant: DAIKIN INDUSTRIES, LTD., Osaka-shi, Osaka (JP)

(72) Inventors: Nanae Kinugasa, Kusatsu (JP); Seiji Kawai, Kusatsu (JP); Tomoyoshi Ashikaga, Kusatsu (JP); Tasuku Nangou, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 608 days.

(21) Appl. No.: 14/371,173

(22) PCT Filed: Oct. 17, 2012

(86) PCT No.: PCT/JP2012/076768
§ 371 (c)(1),
(2) Date: Jul. 8, 2014

(87) PCT Pub. No.: WO2013/105323
PCT Pub. Date: Jul. 18, 2013

(65) Prior Publication Data
US 2015/0005973 A1 Jan. 1, 2015

(30) Foreign Application Priority Data
Jan. 11, 2012 (JP) .................... 2012-002979

(51) Int. Cl.
*G05F 1/66* (2006.01)
*H02J 3/14* (2006.01)
(Continued)

(52) U.S. Cl.
CPC .............. *G05F 1/66* (2013.01); *G06Q 50/06* (2013.01); *H02J 3/14* (2013.01); *H02J 13/001* (2013.01);
(Continued)

(58) Field of Classification Search
None
See application file for complete search history.

(56) References Cited

U.S. PATENT DOCUMENTS 6,522,987 B1 * 2/2003 Flink .................. H04L 12/2801
702/107
2007/0186121 A1 8/2007 Yasuo
(Continued)

FOREIGN PATENT DOCUMENTS

EP 1 816 544 A2 8/2007
GB 2479060 A 9/2011
(Continued)

OTHER PUBLICATIONS

European Search Report of corresponding EP Application No. 12 86 4944.9 dated Sep. 17, 2015.
(Continued)

*Primary Examiner* — Tuan Dao
(74) *Attorney, Agent, or Firm* — Global IP Counselors, LLP

(57) ABSTRACT

An energy control device adjusts an amount of energy consumed by mechanical equipment placed at a property. The energy control device includes a first control unit and a second control unit. The first control unit executes a first adjustment control during a prescribed adjustment period. The first adjustment control adjusts an amount of energy consumed by the mechanical equipment in order to respond to a prescribed event. The second control unit executes a second adjustment control separate from the first adjustment control during a non-adjustment period after the adjustment period.

7 Claims, 10 Drawing Sheets

(51) Int. Cl.
*G06Q 50/06* (2012.01)
*H02J 13/00* (2006.01)

(52) U.S. Cl.
CPC ..... *H02J 2003/143* (2013.01); *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | | |
|---|---|---|---|
| 2009/0234521 A1* | 9/2009 | Kumar | B60L 11/1851 701/19 |
| 2010/0179708 A1* | 7/2010 | Watson | G06Q 50/06 700/296 |
| 2011/0016336 A1* | 1/2011 | Mori | G06F 3/0625 713/320 |
| 2011/0051823 A1* | 3/2011 | Imes | F24F 11/0086 375/259 |
| 2012/0095601 A1* | 4/2012 | Abraham | E06B 9/68 700/278 |
| 2012/0330469 A1 | 12/2012 | Kinugasa et al. | |

FOREIGN PATENT DOCUMENTS

| | | |
|---|---|---|
| JP | 11-325539 A | 11/1999 |
| JP | 2007-213167 A | 8/2007 |
| JP | 2011-149572 A | 8/2011 |
| WO | 2011111477 A1 | 9/2011 |

OTHER PUBLICATIONS

International Preliminary Report of corresponding PCT Application No. PCT/JP2012/076768 dated Jul. 24, 2014.
International Search Report of corresponding PCT Application No. PCT/JP2012/076768.

* cited by examiner

| ADJUSTMENT PERIOD | AMOUNT OF INCREASE |
|---|---|
| 15 MINUTES | 5% |
| 30 MINUTES | 10% |
| 60 MINUTES | 20% |

ENERGY CONTROL DEVICE AND ENERGY CONTROL SYSTEM EQUIPPED WITH THE ENERGY CONTROL DEVICE

CROSS-REFERENCE TO RELATED APPLICATIONS

This U.S. National stage application claims priority under 35 U.S.C. §119 (a) to Japanese Patent Application No. 2012-002979, filed in Japan on Jan. 11, 2012, the entire contents of which are hereby incorporated herein by reference.

TECHNICAL FIELD

The present invention relates to an energy control device and an energy control system equipped with the energy control device.

BACKGROUND ART

There has hitherto been proposed, for example as disclosed in Japanese Laid-open Patent Application No. 2011-149572, a demand control system for limiting a capacity of an air conditioner or other piece of mechanical equipment on the basis of a power suppression signal requesting adjustment of power demand, being transmitted from a demand controller.

SUMMARY

Technical Problem

Incidentally, when the amount of energy consumption is adjusted by limiting the capacity of the mechanical equipment as illustrated in the abovementioned patent document 1, there is a concern that the amount of energy consumption may suddenly increase during a period (T2 in FIG. 1) immediately after the adjustment period (T1 in FIG. 1) in an attempt to restore a convenience, amenity, and/or the like, that was lost due to the capacity limit, as illustrated in FIG 1. Because it is desirable that the supply and demand of power be constant from the aspect of the power company supplying the power, a sudden increase of the amount of energy consumption after adjustment of the amount of energy consumption becomes a problem. It is therefore imagined to impose a penalty, such as to deny a fee discount or other incentive for adjusting the amount of energy consumption in response to a demand adjustment request, for a sudden increase of the amount of energy consumption after adjustment. Accordingly, it is desirable also from the aspect of the energy-demanding party to avoid a sudden increase of the amount of energy consumption after adjustment of the amount of energy consumption in response to a demand adjustment request, variation in unit energy cost, or another event.

An object of the present invention is to provide an energy control device that can be used to restore an amenity at a property in a manner so that the amount of energy consumption does not suddenly increase after adjustment of the amount of energy consumption, and to provide an energy control system equipped with the energy control device.

Solution to Problem

An energy control device according to a first aspect of the present invention is used for adjusting an amount of energy consumed by mechanical equipment placed at a property, and comprises a first control unit and a second control unit. The first control unit executes during a prescribed adjustment period a first adjustment control for adjusting the amount of energy consumed by said mechanical equipment in order to respond to a prescribed event. The second control unit executes a second adjustment control separate from the first adjustment control during a non-adjustment period after the adjustment period, In the energy control device according to the first aspect of the present invention, the first control unit executes the first adjustment control for adjusting the amount of energy consumed by the mechanical equipment during the prescribed adjustment period in order to respond to the prescribed event, and the second control unit executes the second adjustment control separate from the first adjustment control during the non-adjustment period after the adjustment period. An amenity at the property can thereby be restored in a manner so that the amount of energy consumption does not suddenly increase after adjustment of the amount of energy consumption.

"Amount of energy consumption" means an amount of energy consumed. "Energy" means, for example, electricity, and "amount of energy" means, for example, power expressed in units of watts, or the like, or an amount of power expressed in units of watt-hours, or the like.

The energy control device according to a second aspect of the present invention is the energy control device according to the first aspect, wherein the prescribed event is at least one of variation in unit energy cost, increase of the amount of energy consumed by the mechanical equipment, and a demand adjustment request from an energy supply company.

In the energy control device according to the second aspect of the present invention, an amenity at the property can be restored in a manner so that the amount of energy consumption does not suddenly increase after adjustment of the amount of energy consumption in order to respond to at least one event of variation in unit energy cost, increase of the amount of energy consumed by the mechanical equipment, and a demand adjustment request from an energy supply company.

The energy control device according to a third aspect of the present invention is the energy control device according to the first or second aspect, wherein the second adjustment control is a control for adjusting the amount of energy consumed by the mechanical equipment to a prescribed amount of energy consumption or lower.

In the energy control device according to the third aspect of the present invention, the second adjustment control is performed to adjust the amount of energy consumed by the mechanical equipment to a prescribed amount of energy consumption or lower after the adjustment period. The amenity at the property can thereby be restored in a manner so that the amount of energy consumption does not increase exceeding the prescribed amount of energy consumption after adjustment of the amount of energy consumption.

The energy control system according to a fourth aspect of the present invention comprises the energy control device according to any of the first to third aspects and a communication device. The communication device has a receiving unit for receiving information related to the prescribed event from a higher-level energy management system.

The amenity at the property can thereby be restored in a manner so that the amount of energy consumption does not suddenly increase after adjustment of the amount of energy consumption in accordance with the demand adjustment request or other prescribed event.

The energy control system according to a fifth aspect of the present invention is the energy control system according to the fourth aspect, further comprising an energy consumption amount-determining device. The energy consumption amount-determining device determines the prescribed amount of energy consumption before the adjustment period ends.

In the energy control system according to the fifth aspect, the energy consumption amount-determining device for determining the prescribed amount of energy consumption before the adjustment period ends is further provided. An upper limit of the amount of energy consumed after the adjustment period can thereby be determined in advance. Accordingly, the amenity at the property can be restored in a manner so that the amount of energy consumption does not suddenly increase after adjustment of the amount of energy consumption in accordance with the demand adjustment request or other prescribed event. Accordingly the amenity at the property can be restored in a manner so that the amount of energy consumption does not suddenly increase after adjustment of the amount of energy consumption.

The energy control system according to a sixth aspect of the present invention is the energy control system according to the fifth aspect, wherein the communication device further has a presentation unit. The presentation unit presents the prescribed amount of energy consumption to the higher-level energy management system.

In the energy control system according to the sixth aspect of the present invention, notification of the amount of energy consumed after the adjustment can be given to the power company. The power company can thereby understand in advance the amount of energy consumption of the demanding party after the adjustment period.

The energy control system according to a seventh aspect of the present invention is the energy control system according to the fifth or sixth aspect, further comprising a storage device. The storage device stores information related to the amount of energy consumed by the mechanical equipment. The energy consumption amount-determining device determines the prescribed amount of energy consumption on the basis of the information stored by the storage device.

In the energy control system according to the seventh aspect of the present invention, the prescribed amount of energy consumption can be determined on the basis of the information related to the amount of energy consumed by the mechanical equipment. The amount of energy consumed after the adjustment period can thereby be understood as accurately as possible.

The energy control system according to an eighth aspect of the present invention is the energy control system according to the seventh aspect, wherein the energy consumption amount-determining device determines the prescribed amount of energy consumption on the basis of the amount of energy consumed by the mechanical equipment before the adjustment period.

In the energy control system according to the eighth aspect of the present invention, the amount of energy consumed after the adjustment period can be calculated as accurately as possible on the basis of the amount of energy consumption before the adjustment period.

The energy control system according to a ninth aspect of the present invention is the energy control system according to the fifth or sixth aspect, wherein the communication device further has a supply and demand information receiving unit. The supply and demand information receiving unit receives energy supply and demand information from the higher-level energy management system. The energy consumption amount-determining device determines the prescribed amount of energy consumption on the basis of the energy supply and demand information.

In the energy control system according to the ninth aspect of the present invention, the amount of energy consumed after the adjustment period can be determined on the basis of the energy supply and demand information.

Advantageous Effects of Invention

In the energy control device according to be first aspect of the present invention, the amenity at the property can be restored in a manner so that the amount of energy consumption does not suddenly increase after adjustment of the amount of energy consumption.

In the energy control device according to the second aspect of the present invention, the amenity at the property can be restored in a manner so that the amount of energy consumption does not suddenly increase after adjustment of the amount of energy consumption in order to respond to variation in unit energy cost, increase of the amount of energy consumed by the mechanical equipment, a demand adjustment request from an energy supply company, or other event.

In the energy control device according to the third aspect of the present invention, the amenity at the property can be restored in a manner so that the amount of energy consumption does not increase exceeding the prescribed amount of energy consumption after adjustment of the amount of energy consumption.

In the energy control system according to the fourth or fifth aspect of the present invention, the amenity at the property can be restored in a manner so that the amount of energy consumption does not suddenly increase after adjustment of the amount of energy consumption in accordance with the demand adjustment request or other prescribed event.

In the energy control system according to the sixth aspect of the present invention, the power company can understand in advance the amount of energy consumption of the demanding party after the adjustment period.

In the energy control system according to the seventh or eighth aspect of the present invention, the amount of energy consumed after the adjustment period can be understood as accurately as possible.

In the energy control system according to the ninth aspect of the present invention, the amount of energy consumable after the adjustment period can be determined on the basis of the energy supply and demand information.

DESCRIPTION OF EMBODIMENTS

An embodiment of the energy control device and the energy control system equipped with the energy control device according to the present invention is described below with reference to the drawings.

(1) Overall Configuration

Figure 2:
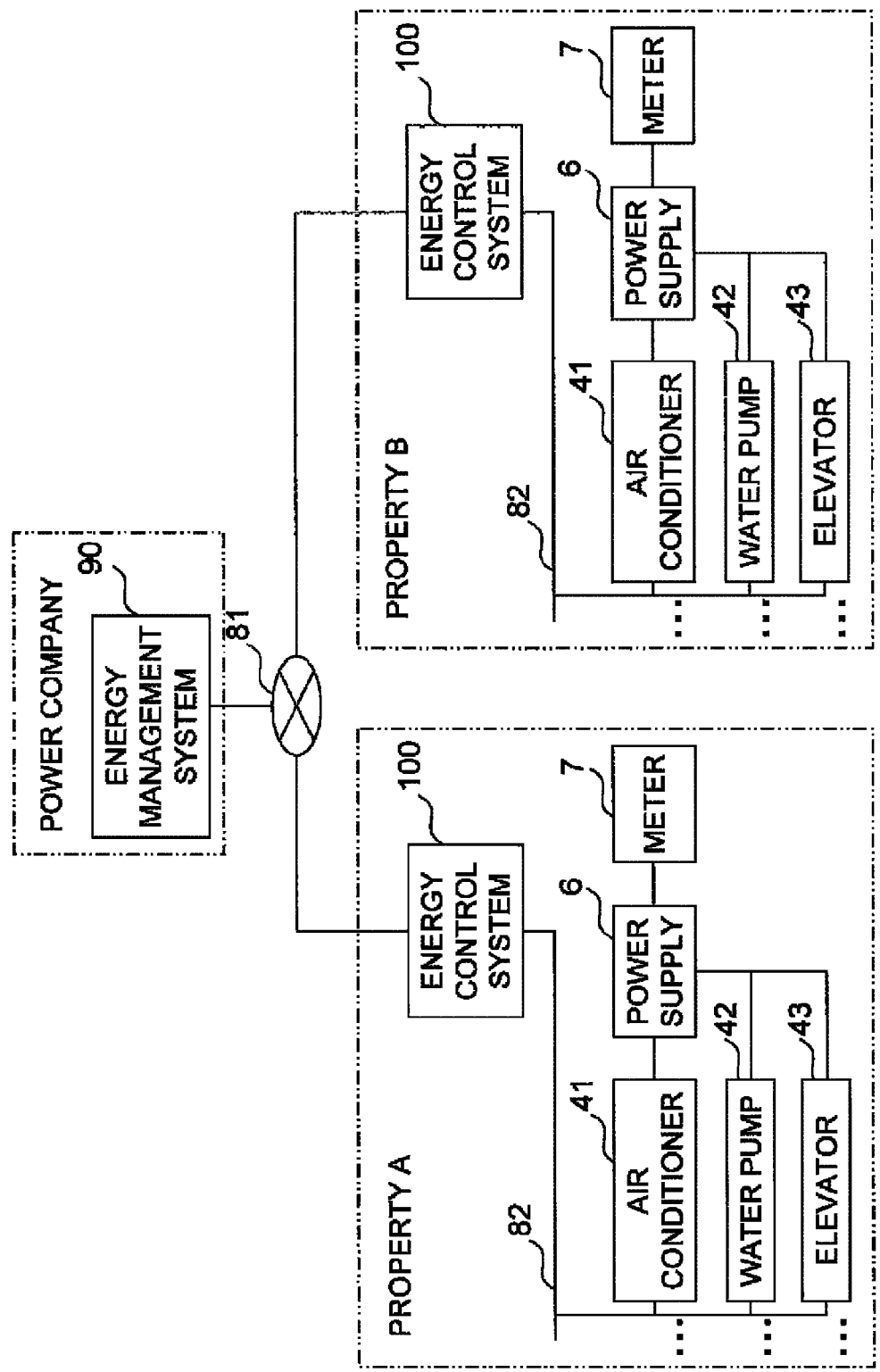
FIG. 2 is a layout diagram of the energy control system according to the present invention.

FIG. 2 is a layout diagram of an energy control system 100 that is one example of the energy control system according to the present invention.

The energy control system 100 is disposed at properties A and B that are buildings, plants, and/or other structures, and manages the amount of energy consumption of mechanical equipment placed within the properties A and B. The mechanical equipment is, for example, air conditioners 41, ..., water pumps 42, ..., elevators 43, ..., and the like (these are hereinafter referred to collectively as "mechanical equipment 41, 42, 43, ..."). A power supply 6 and a meter 7 for metering energy supplied from the power supply 6 to each piece of mechanical equipment 41, 42, 43, ... are additionally placed at each property A and B. The energy control system 100 and the mechanical equipment 41, 42, 43, ..., as well as the meter 7, are connected by a LAN or other communication network 82. The energy control system 100 is also connected via the Internet or another communication network 81 with an energy management system 90 of a power company supplying energy to the properties A and B. "Amount of energy consumption" means an amount of energy consumed. "Energy" means, for example, electricity, and "amount of energy" means, for example, power expressed in units of watts, or the like, or an amount of power expressed in units of watt-hours, or the like, The energy management system 90 is a system configured with one or more computers, and is used for managing energy supplied to a plurality of properties including properties A and B, by adjusting an amount of supply of energy relative to demand at these properties. Various kinds of information related to energy supply and demand are exchanged between the energy management system 90 and each energy control system 100.

For example, the power company transmits a demand adjustment request requesting suppression of consumption of the amount of energy consumption during a prescribed period (hereinafter referred to as "adjustment period T1") from the energy management system 90 to the energy control system 100 at each property A and B. Here, the content of the demand adjustment request, that is, the suppressed amount of the amount of energy consumed by the entirety of the mechanical equipment 41, 42, 43, ... at each property A and B is referred to as the "requested suppressed amount of energy." The upper limit of the consumable amount of energy for achieving the requested suppressed amount of energy is referred to as the "requested amount of energy W1." The requested suppressed amount of energy may also be a value determined on the basis of the suppressible amount of energy transmitted, that is, reported by the energy control system 100 to the energy management system 90. The requested suppressed amount of energy may be a value determined independently by the power company.

Figure 1:
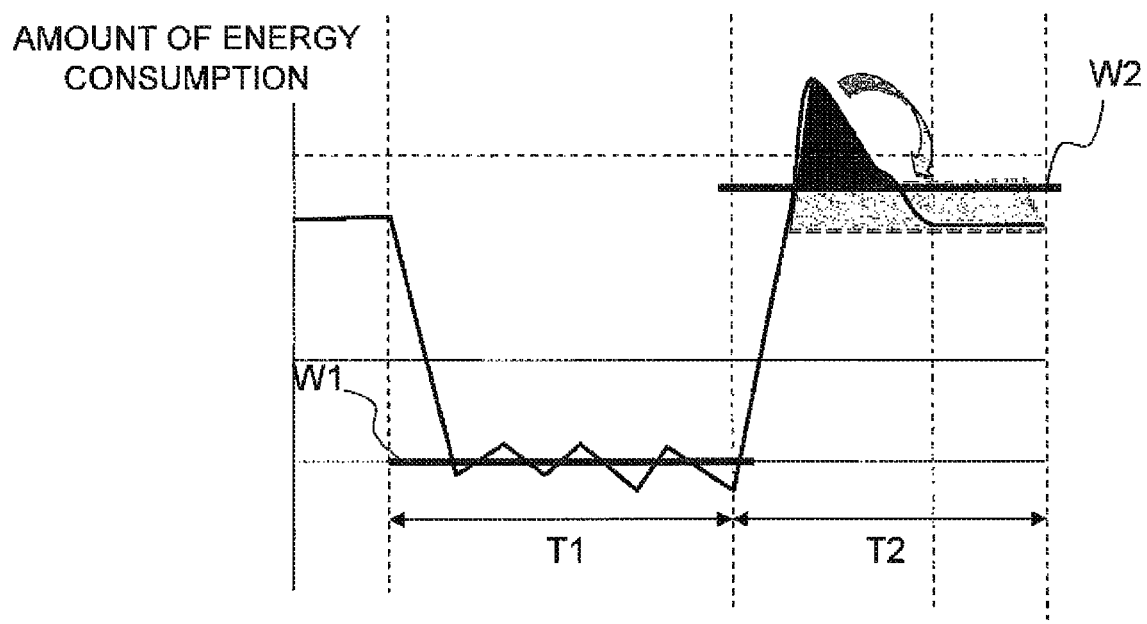
FIG. 1 is a graph expressing the trend along the time axis of the amount of energy consumption of the entirety of mechanical equipment within a property.

FIG. 1 is a graph expressing the trend along the time axis of the amount of energy consumption of the entirety of mechanical equipment 41, 42, 43, ... at one property A or B. Each energy control system 100 having received a demand adjustment request controls so that the amount of energy consumption of the entirety of the mechanical equipment 41, 42, 43, ... at the property A or B managed by the given energy control system 100 during the adjustment period T1 (for example, 15 minutes from 3:00 p.m.) indicated by the given demand adjustment request is reduced, for example, so that 500 kW is brought to 400 kW or lower, and controls so that the amount of energy consumption is suppressed by the requested suppressed amount of energy (for example, 2.5 kWh). That is, the amount of energy consumption is adjusted to be held near a requested amount of energy W1 during the adjustment period T1.

When the adjustment period T1 elapses, each piece of mechanical equipment 41, 42, 43, ... comes to operate in a state near an upper limit of operating capacity in order to restore an amenity at the properties A and B provided by each piece of mechanical equipment 41, 42, 43, ... that has been lowered during the adjustment period T1. For example, an air conditioner 41, ... operates at high output in order to eliminate a difference between a set temperature and a room temperature, which has become dissociated during the adjustment period T1. A water pump 42, ..., if the output is variable, operates at high output in order to pump water up to a water storage tank in which the balance has been lost during the adjustment period T1. An elevator 43, ... operates continuously in order to clear queues of people waiting for the elevator 43, ... during the adjustment period. The amount of energy consumption thus suddenly increases during the period T2 after the adjustment period T1 as illustrated in FIG. 1. The energy control system 100 therefore determines as an allowed amount of energy consumption W2 an upper limit of the amount of energy consumption after the adjustment period T1 of each piece of mechanical equipment 41, 42, 43, ... at the managed properties A and B, and controls so that the amount of energy consumption of the entirety of the mechanical equipment 41, 42, 43, ... does not exceed the allowed amount of energy consumption W2 after the adjustment period T1.

(2) Detailed Configuration Of The Energy Control System

Figure 3:
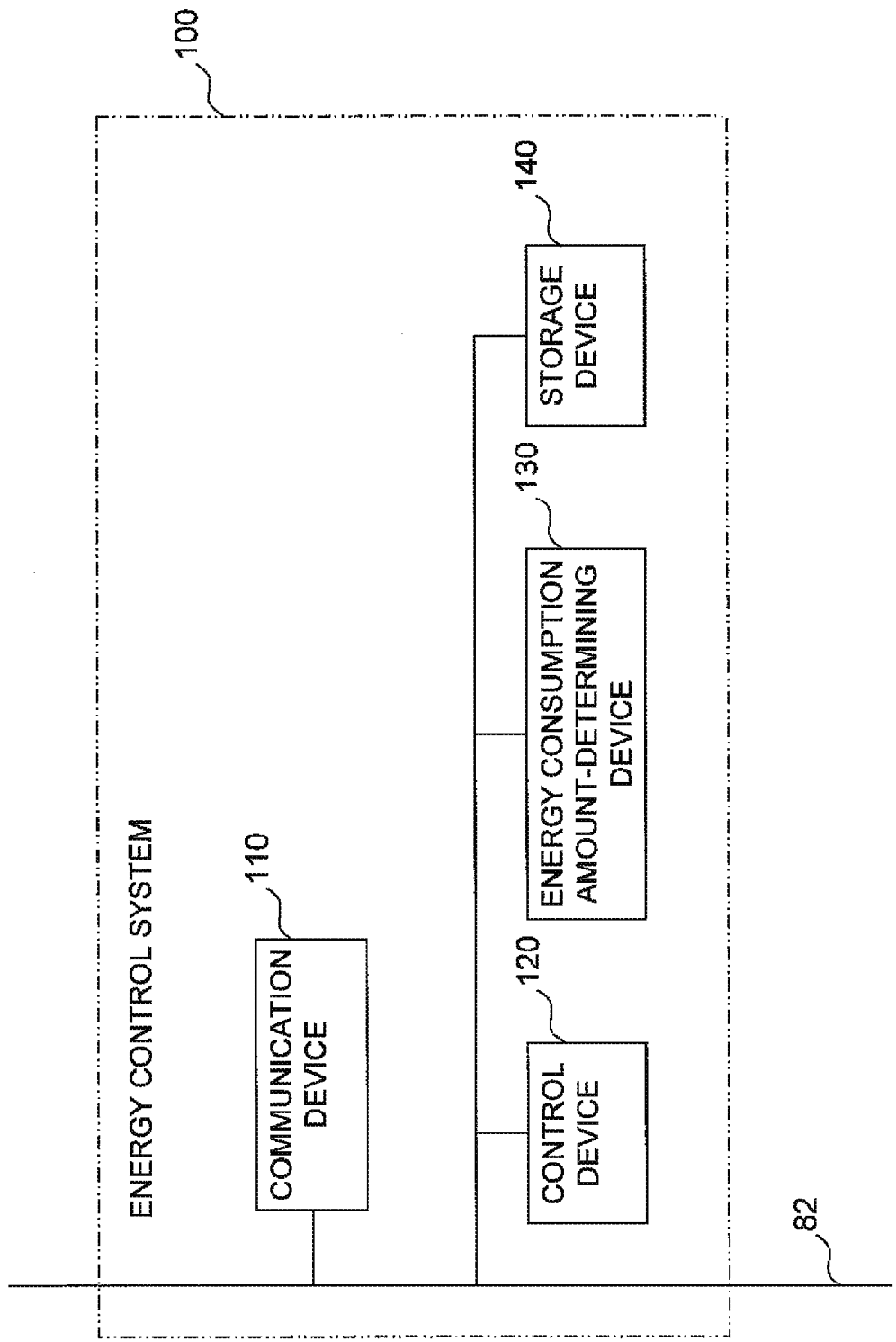
FIG. 3 is a schematic configuration diagram of the energy control system according to the present invention.

FIG. 3 is a schematic configuration diagram of the energy control system 100. The energy control system 100 comprises a communication device 110, a control device 120, a storage device 140, and an energy consumption amount-determining device 130. The communication device 110, control device 120, storage device 140, and energy consumption amount-determining device 130 are connected by a LAN or other communication network 82. The energy control system 100 is described below. Because the energy control system 100 placed at the property A and the energy control system 100 placed at the property B have the same configuration, unless specified otherwise, the energy control system 100 is described as being the one placed at the property A in FIG. 2 for convenience of description.

(2-1) Communication Device 110

Figure 4:
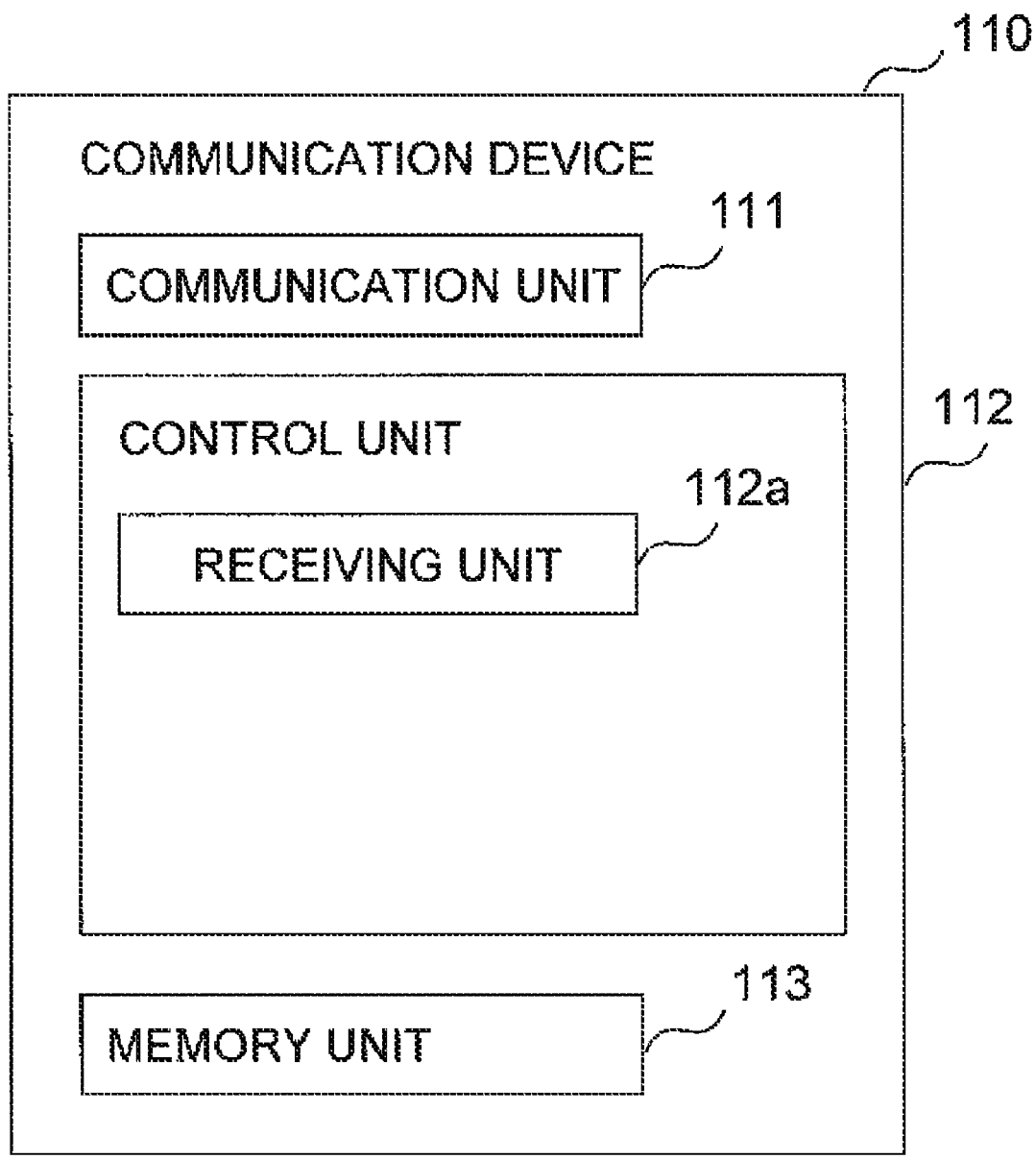
FIG. 4 is a general configuration diagram of the communication device according to the present invention.

The communication device 110 is a device for exchanging demand adjustment requests and various other kinds of information with the energy management system 90. FIG. 4 is a general configuration diagram of the communication device 110. The communication device 110 mainly has a communication unit 111, a control unit 112, and a memory unit 113, as illustrated in FIG. 4.

The communication unit 111 is an interface for making the communication device 110 connectable with the communication networks 81 and 82 using Ethernet®, or the like.

The memory unit 113 mainly comprises a RAM, ROM, hard disk, and the like, and stores a program for the communication device and various other kinds of information.

The control unit 112 mainly comprises a CPU, and executes the program for the communication device stored in the memory unit 113. The control unit 112 functions as a receiving unit 112*a*, or the like, by execution of the program for the communication device.

The receiving unit 112*a* receives information related to a prescribed event. In the present embodiment, the receiving unit 112*a* receives a demand adjustment request and an adjustment period from the energy management system. Specifically, the receiving unit arranges for the demand adjustment request including the adjustment period received from the energy management system 90 by the communication unit 111 via the communication network 81 to be stored in the memory unit 113.

(2-2) Control Device 120

Figure 5:
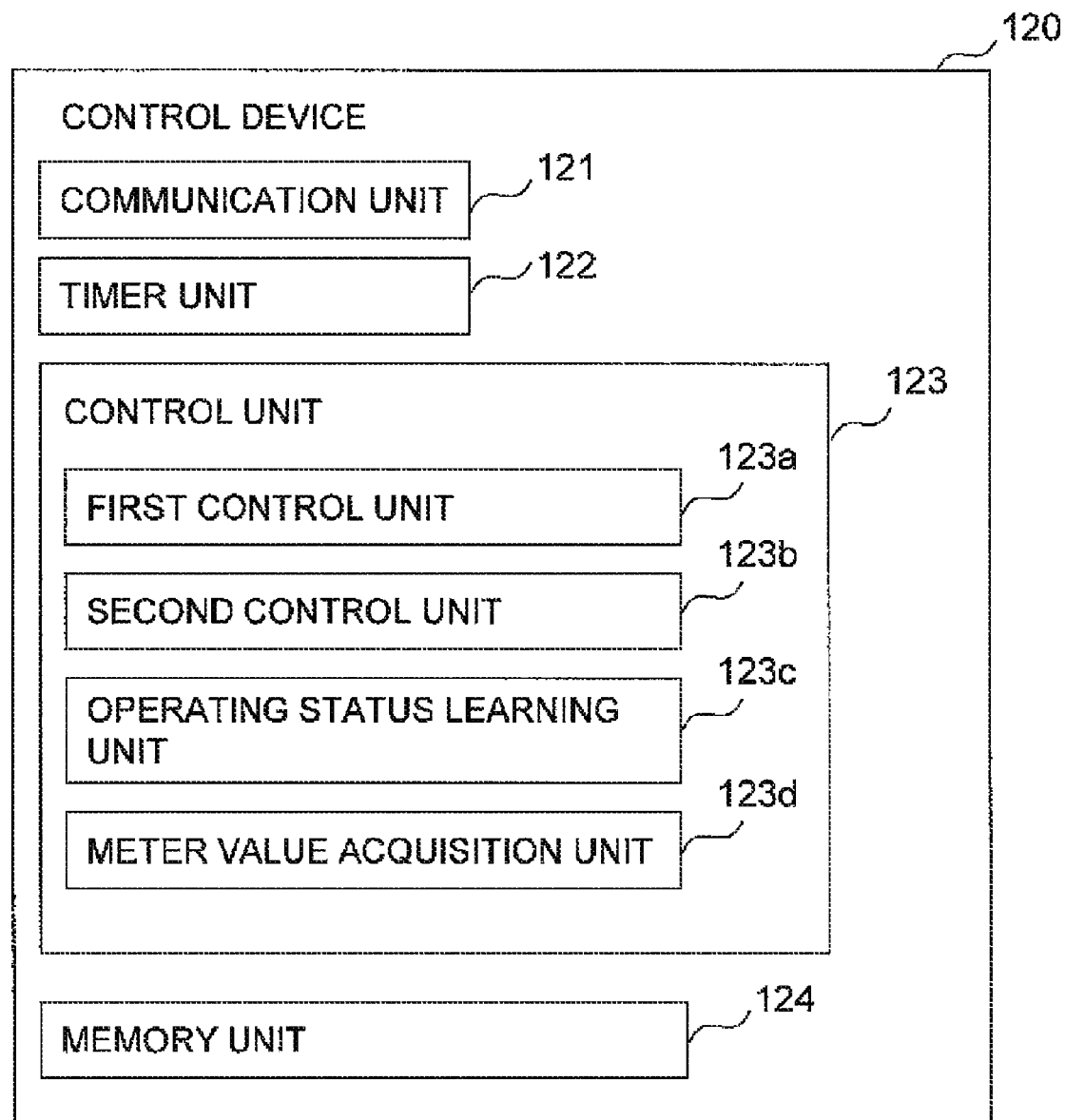
FIG. 5 is a general configuration diagram of the energy control device according to the present invention.

FIG. 5 is a general configuration diagram of the control device 120. The control device 120 is a device for controlling each piece of mechanical equipment 41, 42, 43, . . . , and is connected with each piece of mechanical equipment 41, 42, 43, . . . via a LAN or other communication network 82. The control device 120 mainly has a communication unit 121, a timer unit 122, a control unit 123, and a memory unit 124, as illustrated in FIG. 5.

The communication unit 121 is an interface for making the control device 120 connectable with the communication networks 81 and 82 using Ethernet, or the like.

The timer unit 122 meters elapsed time or another time element based on time, day, month, year, day of the week, or prescribed time.

The memory unit 124 mainly comprises a RAM, ROM, hard disk, and the like, and stores a program for the control device and various other kinds of information.

The control unit 123 mainly comprises a CPU, and executes the program for the control device stored in the memory unit 124. The control unit functions as an operating status learning unit 123*c*, a meter value acquisition unit 123*d*, a first control unit 123*a*, a second control unit 123*b*, and the like, by execution of the program for the control device.

The functions of the control unit 123 are described below.

The operating status learning unit 123*c* collects information related to each piece of mechanical equipment 41, 42, 43, . . . in a prescribed time interval (for example, five-minute interval). Specifically, the operating status learning unit 123*c* acquires from each piece of mechanical equipment 41, 42, 43, . . . information related to the operating status of each piece of mechanical equipment 41, 42, 43, . . . , and arranges for the information to be stored as operating status information 143*a* in the storage device 140 to be described.

The meter value acquisition unit 123*d* acquires in a prescribed time interval (for example, one-minute interval) a meter value (data related to the amount of energy consumption) metered by the meter 7. The meter value acquisition unit 12.3*d* instructs the storage device 140 to be described to store the meter value as meter information 143*b* in correspondence with each piece of mechanical equipment 41, 42, 43, . . . .

The first control unit 123*a* performs a first adjustment control with respect to each piece of mechanical equipment 41, 42, 43, . . . in order to respond to a prescribed event. "Prescribed event" in the present embodiment means a demand adjustment request from a power company. Accordingly, "first adjustment control" in the present invention is a control to suppress the amount of energy consumption of each piece of mechanical equipment 41, 42, 43, . . . during the adjustment period so that the requested suppressed amount of energy can be achieved in accordance with the demand adjustment request. Specifically, the amount of energy consumption is suppressed by controlling to limit the operating capacity of each piece of mechanical equipment 41, 42, 43, . . . during the adjustment period T1.

The second control unit 123*b* performs a second adjustment control with respect to each piece of mechanical equipment 41, 42, 43, . . . in order to suppress a large increase of the amount of energy consumption after the adjustment period T1. "Second adjustment control" is a control to suppress so that the amount of energy consumption of the entirety of the mechanical equipment 41, 42, 43, . . . does not exceed a prescribed value after the adjustment period T1 elapses. The period after the adjustment period T1 elapses, that is, the period in which second adjustment control is executed, is referred to as the "non-adjustment period" (T2 in FIG. 2).

(2-3) Storage Device 140

Figure 6:
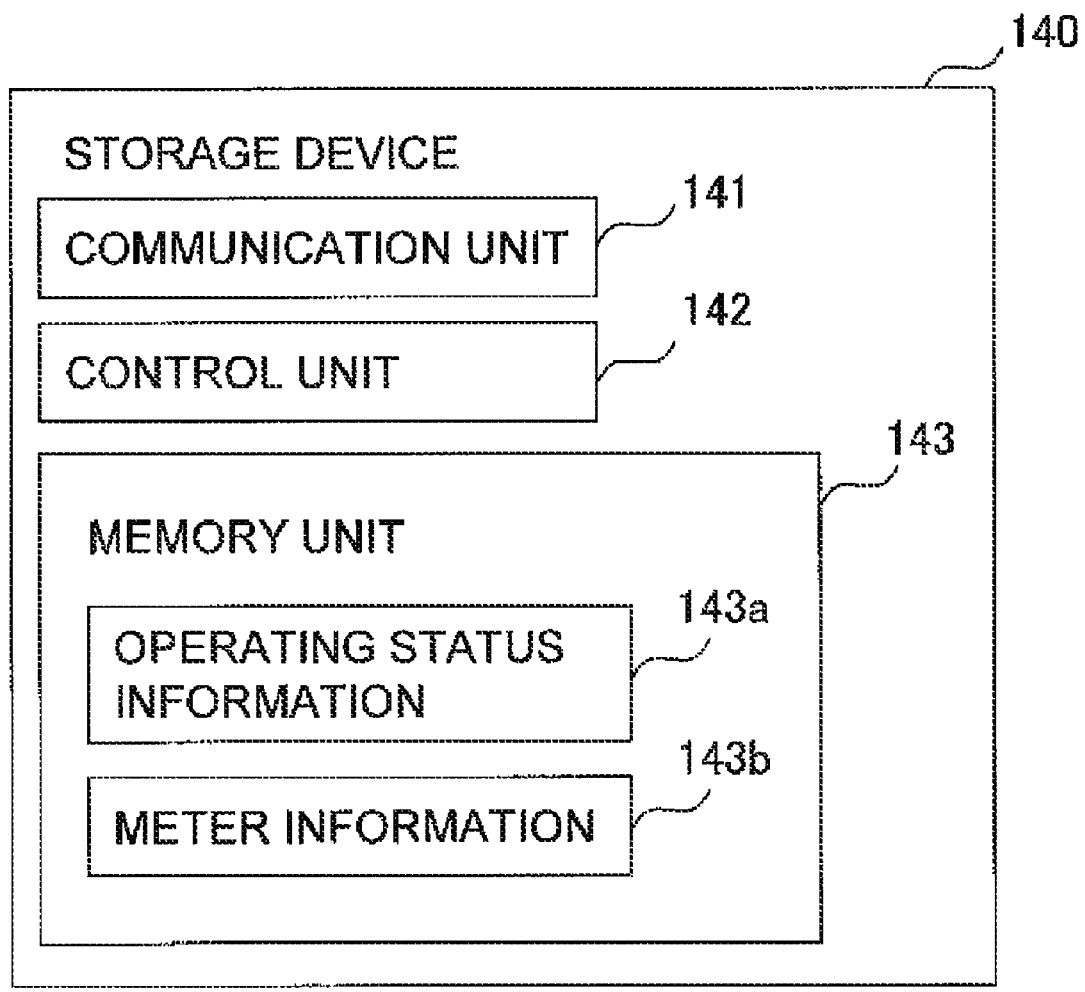
FIG. 6 is a general configuration diagram of the storage device according to the present invention.

FIG. 6 is a general configuration diagram of the storage device 140. The storage device 140 is a device for storing information related to the operating status and/or amount of energy consumed by the mechanical equipment 41, 42, 43, . . . , and the like. The storage device 140 mainly has a communication unit 141, a control unit 142, and a memory unit 143, as illustrated in FIG. 6.

The communication unit 141 is an interface for making the control device 120 connectable with the communication networks 81 and 82 using Ethernet®, or the like.

The control unit 142 mainly comprises a CPU, and executes a DBMS or other program for the storage device stored in the memory unit 143. The control unit 142 stores information indicated by instructions from the control device 120 and other devices in the memory unit 143, and reads the information from the memory unit 143.

The memory unit 143 mainly comprises a RAM, ROM, hard disk, and the like. The memory unit 143 stores the abovementioned operating status information 143*a*, as well as the meter information 143*b* and various other kinds of information, and/or the program for the storage device.

"Operating status information 143*a*" specifically includes, for example, operating/stopped state of an air conditioner 41, . . . , set temperature, cooling/warming and other operating modes, operating time, operating rate, operating capacity during operation, state value (rotation number of a fan, rotation number of a compressor, degree of opening of an expansion valve, refrigerant temperature, refrigerant pressure, and the like) of each kind of machine of outdoor unit and indoor unit, outdoor temperature, indoor temperature, intake temperature, allowed degree of dissociation between set temperature and indoor temperature, execution/non-execution of energy suppression control, and the like. Here, "operating capacity during operation" of an air conditioner 41, . . . indicates the extent of operation (specifically, for example, the frequency during operation of the compressor) of the air conditioner 41, . . . during operation.

Various kinds of temperatures, pressures, and/or the like, included in the operating status are detected by various kinds of sensors, and the like, not illustrated. Operating/stopped state of the water pump 42, . . . , operating/stopped state of the elevator 43, . . . , ascending and descending speed, degree of acceleration, load weight, and the like, are additionally included.

"Meter information 143b" means information related to a meter value of the meter 7 expressing the amount of energy consumption for each prescribed time (for example, five minutes) of each piece of mechanical equipment 41, 42, 43, . . . . For example, it is information that one of the air conditioners 41, . . . consumes 10 Wh in five minutes from 1:00 p.m.

(2-4) Energy Consumption Amount-Determining Device 130

Figure 7:
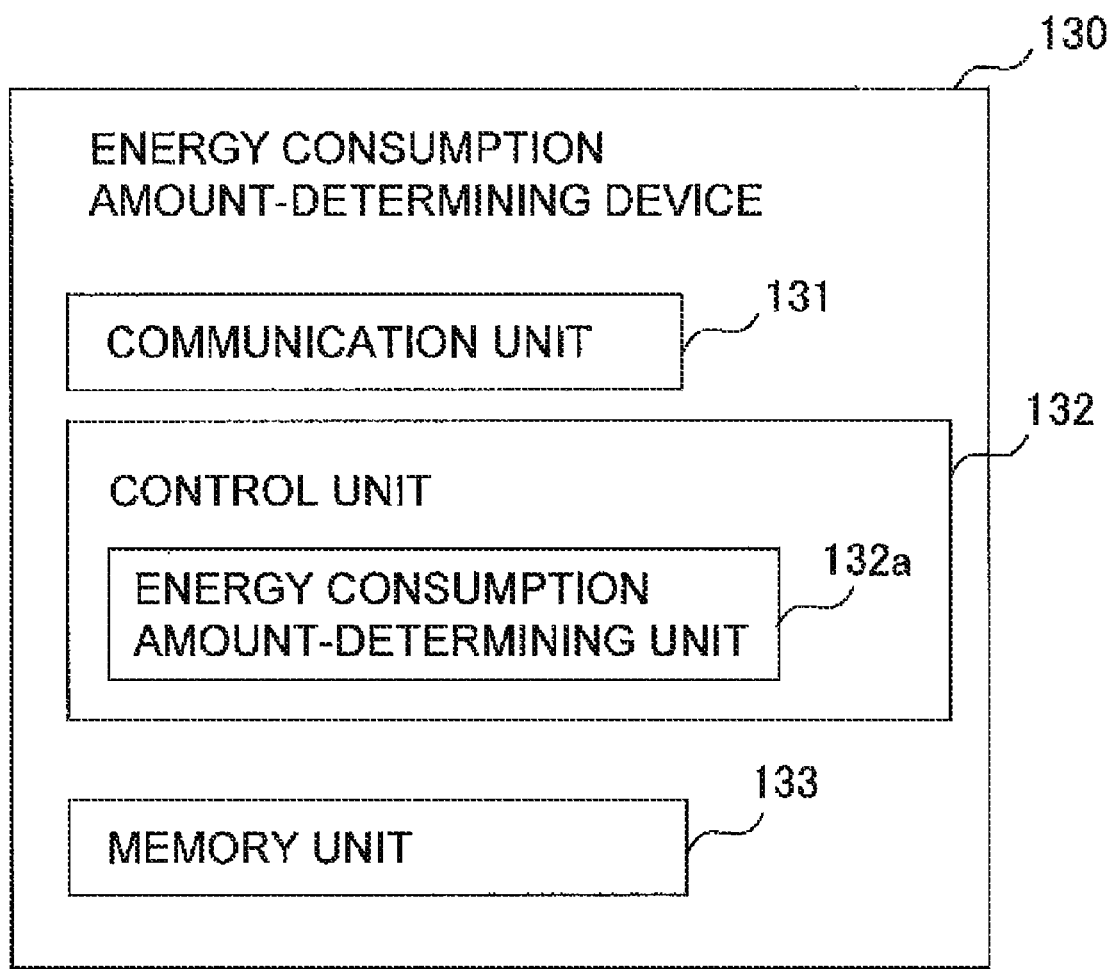
FIG. 7 is a general configuration diagram of the energy consumption amount-determining device 130 according to the present invention.

FIG. 7 is a general configuration diagram of the energy consumption amount-determining device 130. The energy consumption amount-determining device 130 is a device for computing the amount of energy consumption of the entirety of the mechanical equipment 41, 42, 43, . . . managed by the energy control system 100, that is, the amount of energy consumption of each property. The energy consumption amount-determining device 130 mainly has a communication unit 131, a control unit 132, and a memory unit 133, as illustrated in FIG. 7.

The communication unit 131 is an interface for making the energy consumption amount-determining device 130 connectable with the communication networks 81 and 82 using Ethernet®, or the like.

The memory unit 133 mainly comprises a RAM, ROM, hard disk, and the like, and stores a program for the energy consumption amount-determining device and various other kinds of information.

The control unit 132 mainly comprises a CPU, and executes the program for the energy consumption amount-determining device stored in the memory unit 133. The control unit functions as an energy consumption amount-determining unit 132a, or the like, by execution of the program for the energy consumption amount-determining device.

The energy consumption amount-determining unit 132a determines the amount of energy consumption of the entirety of the mechanical equipment 41, 42, 43, . . . after the end of the adjustment period T1, before the adjustment period T1 ends, that is, before the start of the first adjustment control or before the end of the first adjustment control. That is, the upper limit (allowed amount of energy consumption W2) of the entirety of the mechanical equipment 41, 42, 43, . . . during the second adjustment control performed after the first adjustment period T1 is determined in advance. Specifically, the energy consumption amount-determining unit determines the allowed amount of energy consumption W2 after the adjustment period T1 on the basis of the amount of energy consumed by the mechanical equipment 41, 42, 43, . . . before the adjustment period.

(3) Flow of Control Performed by Energy Control System 100

Figures 8, 9:
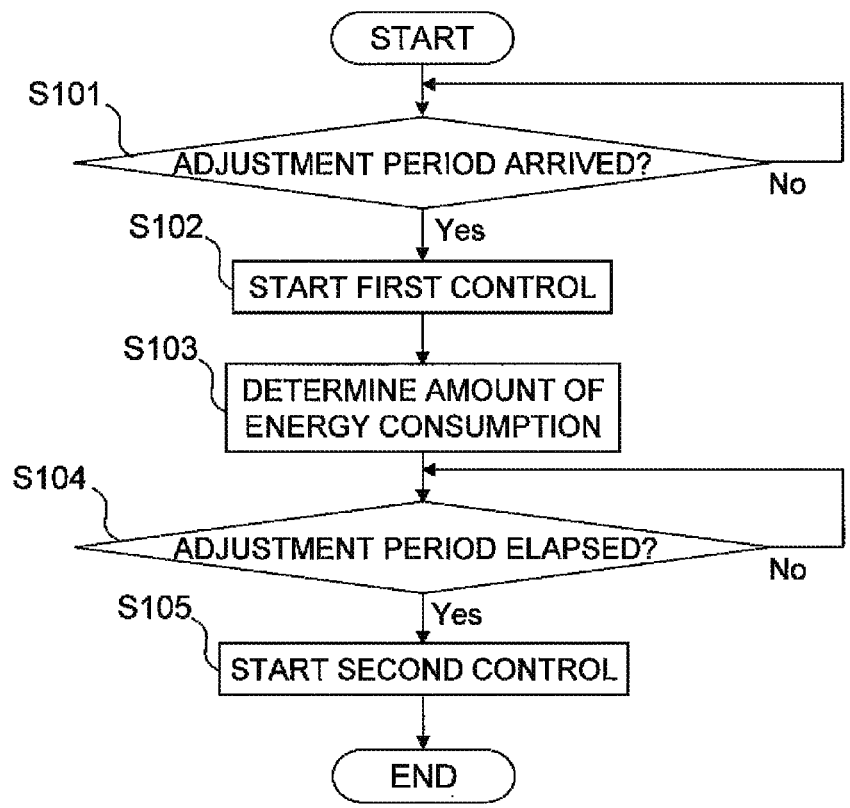
FIG. 8 is a flow chart of control performed by the energy control system.
FIG. 9 is a table for describing one example of the process of determination of an allowed amount of energy consumption.

FIG. 8 is a flow chart of control related to each piece of mechanical equipment 41, 42, 43, . . . performed by the energy control system 100. The control flow is described below while referring to FIG. 8.

The control flow starts when the energy control system 100 receives a demand adjustment request from the energy management system 90. Specifically, when the communication unit 111 of the communication device 110 receives the demand adjustment request from the energy management system 90, the receiving unit 112a arranges for the demand adjustment request to be stored in the memory unit 113. The receiving unit 112a also transmits the demand adjustment request along with a message stating that the demand adjustment request has been received to the control device 120 via the communication unit 111. The control device 120 starts the following control flow when the message is received.

In step S101, the control unit 123 of the control device 120 determines whether the adjustment period T1 has arrived. If the adjustment period has not arrived, step S101 is iterated until the adjustment period arrives. If the adjustment period has arrived, the control flow advances to step S102.

In step S102, the first control unit 123a of the control device 120 starts the first adjustment control. The details of the first adjustment control are described later.

In step S103, the energy consumption amount-determining unit 132a of the energy consumption amount-determining device 130 determines the amount of energy consumption (allowed amount of energy consumption W2) after the adjustment period T1. The details of the allowed amount of energy consumption W2 are described later.

In step S104, the first control unit 123a of the control device 120 determines whether the adjustment period T1 has elapsed. If the adjustment period has not elapsed, the first adjustment control is continued. Step S104 is iterated until the adjustment period elapses. If the adjustment period has elapsed, the first adjustment control ends, and the control flow advances to step S105.

In step S105, the second control unit 123b of the control device 120 starts the second adjustment control. The details of the second adjustment control are described later.

If the second adjustment control ends, the control flow ends. The second adjustment control ends when the second adjustment control is no longer necessary to be performed, for example, when the amount of energy consumption has not reached the allowed amount of energy consumption W2 during the prescribed period.

(3-1) First Adjustment Control

In the first adjustment control, the amount of energy consumption of each piece of mechanical equipment 41, 42, 43, . . . is adjusted in accordance with the demand adjustment request. For example, the capacity of each piece of mechanical equipment 41, 42, 43, . . . is limited so that the amount of energy consumption of the entirety of the mechanical equipment 41, 42, 43, . . . is reduced by 10% if the demand adjustment request is to suppress the amount of energy consumption of the entirety of the mechanical equipment 41, 42, 43, . . . by 10%; or the amount of energy consumption is reduced by 100 kW if the demand adjustment request is to suppress by 100 kW. Specifically, in the case of air conditioners 41, . . . , control is performed to lower the rotation number of the fan and/or the operating frequency of the compressor, or the like. In the case of conference rooms or other rooms not regularly used, and/or restrooms, and/or halls, or other low-priority spaces subject to air conditioning, the air conditioners 41, . . . in the low-priority spaces subject to air conditioning are compulsorily stopped or are limited in capacity. In the case of elevators 43, . . . , the ascending and descending speed or the degree of acceleration of the elevators 43, . . . is lowered. By extending the time for transport, the amount of energy consumption can be lowered by increasing the carrying capacity in number of people per time, that is, by reducing the number of times of transport. In addition to this, the number of floors for operation may be reduced if a plurality of elevators 43, . . . are provided. In the case of water pumps 42, . . . , water is pumped with priority to a water storage tank for priority use, and pumping of water is suppressed for other tanks The relationship between the capacity, operating rate limit, and/or the like, of each piece of mechanical equipment 41, 42, 43, . . . and the amount of energy consumption can be calculated on the basis of the operating status information 143$a$ and the meter information 143$b$ stored in the storage device. For example, in the case of air conditioners 41, . . . , if the amount of energy consumption of each air conditioner 41, . . . over five minutes during startup of operation when the difference between the set temperature and room temperature is large is 10 Wh, and the amount of energy consumption of each air conditioner 41, . . . over five minutes during thermo-off when there is no difference between the set temperature and room temperature is 1 Wh, it can be estimated that the amount of energy consumption can be suppressed by 9 Wh by switching each air conditioner 41, . . . to thermo-off for five minutes. Or, the relationship between the operating frequency of the compressor and the amount of energy consumption can be estimated by calculating from the operating status information 143$a$ and the meter information 143$b$.

(3-2) Energy Consumption Amount Determination Processing

The energy consumption amount-determining unit 130 acquires the operating status information 143$a$ and the meter information 143$b$ before the adjustment period T1 stored by the storage device 140, and other information related to the amount of energy consumption. The amount of energy consumption of the entirety of the mechanical equipment 41, 42, 43, . . . after the adjustment period T1 (hereinafter referred to as "estimated amount of energy consumption") in the case when the amount of energy consumption is not suppressed by the first adjustment control is calculated on the basis of that information. For example, the amount of energy consumption of the entirety of the mechanical equipment 41, 42, 43, . . . over five minutes immediately before the start of the adjustment period T1 is calculated as the estimated amount of energy consumption.

Next, the energy consumption amount-determining unit 132$a$ determines the amount of increase of the amount of energy consumption allowed after the adjustment period T1 (hereinafter referred to as "allowed amount of increase"). This is determined, for example, in accordance with the table illustrated in FIG. 9. The amount of increase in the table becomes larger proportionally to the length of the adjustment period T1. This is because the range of dissociation between the indoor temperature and the set temperature becomes larger, the number of persons waiting for the elevator 43, . . . becomes greater, or the balance of the water storage tank becomes less, as the period of limitation of the capacity of each piece of mechanical equipment 41, 42, 43, . . . becomes longer. According to the table, if the length of the adjustment period T1 is 15 minutes, 5% of the calculated estimated amount of energy consumption is taken as the allowed amount of increase. Accordingly, the estimated amount of energy consumption plus the allowed amount of increase is determined as the amount of energy consumption (allowed amount of energy consumption W2) that may be consumed by the entirety of the mechanical equipment 41, 42, 43, . . . after the adjustment period T1. The allowed amount of increase as illustrated in the table in FIG. 9 preferably balances the two requirements of restoration of the amenity provided by operation of the mechanical equipment 41, 42, 43, . . . and suppression of sudden increase of the amount of energy consumption. Accordingly, the allowed amount of increase can be determined on the basis of information including the occupancy in number of people at the property A during the adjustment period T1, and/or whether the adjustment period T1 or immediately thereafter is a time period in which there are more people coming and going on lunch break, or the like, or there is greater utilization of the restroom, or the status of dissociation between the set temperature and the indoor temperature during the adjustment period T1, or the balance of the water storage tank.

(3-3) Second Adjustment Control

In the second adjustment control, the amount of energy consumption of the entirety of the mechanical equipment 41, 42, 43, . . . is adjusted to a prescribed amount of energy consumption or lower. "Prescribed amount of energy consumption" in the present embodiment means the allowed amount of energy consumption W2 determined by the energy consumption amount-determining unit. Specifically, in the second adjustment control, when the amount of energy consumption of the entirety of the mechanical equipment 41, 42, 43, . . . at the property A reaches or is likely to reach the allowed amount of energy consumption W2, the amount of energy consumption of each piece of mechanical equipment 41, 42, 43, . . . is adjusted so that the amount of energy consumption of the entirety of the mechanical equipment 41, 42, 43, . . . becomes the allowed amount of energy consumption W2 or lower. Specifically, for example, in the case of air conditioners 41, . . . , control is performed to lower the rotation number of the fan and/or the operating frequency of the compressor, or the like. In the case of conference rooms or other rooms not regularly used, restrooms and/or a halls, or other low-priority spaces subject to air conditioning, the air conditioners 41, . . . in the low-priority spaces subject to air conditioning are compulsorily stopped or are limited in capacity, the difference between the previously set temperature and the room temperature is cleared from the low-priority space subject to air conditioning, or the room temperature is restored with priority from the space subject to air conditioning having the greatest difference between the set temperature and the room temperature. In the case of elevators 43, . . . , the ascending and descending speed or the degree of acceleration of the elevators 43, . . . is lowered. If a plurality of elevators 43, . . . are provided for different uses, the operation of elevators for low-priority uses are not restored to normal. For example, the speed of elevators 43, . . . for lower floors is suppressed, and the speed of elevators 43, . . . for higher floors is restored to normal. In the case of water pumps 42, . . . , water is pumped with priority to a water storage tank for priority use, and pumping of water is suppressed for other tanks (4) Features (4-1)

In the abovementioned embodiment, the first control unit 123$a$ executes during an adjustment period T1 a first adjustment control for adjusting the amount of energy consumption of the entirety of the mechanical equipment 41, 42, 43, . . . in accordance with a demand adjustment request, and the second control unit 123$b$ executes a second adjustment control during a non-adjustment period (T2 in FIG. 1) after the adjustment period T1. The first adjustment control is a control to limit the capacity of each piece of mechanical equipment 41, 42, 43, . . . in order to adjust the amount of energy consumption of each piece of mechanical equipment 41, 42, 43, . . . in order to achieve the suppressed amount of the amount of energy consumption requested by the demand adjustment request. Contrarily, the second adjustment control differs from the first adjustment control in limiting the capacity of each piece of mechanical equipment 41, 42, 43, . . . in order to adjust the amount of energy consumption of each piece of mechanical equipment 41, 42, 43, . . . when the amount of energy consumption of the entirety of the mechanical equipment 41, 42, 43, . . . reaches or is likely to reach a prescribed amount of energy consumption (allowed amount of energy consumption W2). An amenity of properties A and B can thereby be restored in a manner so that the amount of energy consumption does not suddenly increase after adjustment of the amount of energy consumption in accordance with the demand adjustment request, (4-2)

In the abovementioned embodiment, the second adjustment control is performed to limit the capacity of each piece of mechanical equipment 41, 42, 43, . . . in order to adjust the amount of energy consumption of each piece of mechanical equipment 41, 42, 43, . . . when the amount of energy consumption of the entirety of the mechanical equipment 41, 42, 43, . . . reaches or is likely to reach the prescribed amount of energy consumption (allowed amount of energy consumption W2) after the adjustment period T1. The amenity of the properties A and B can thereby be restored in a manner so that the amount of energy consumption does not increase exceeding the prescribed amount of energy consumption after adjustment of the amount of energy consumption in accordance with the demand adjustment request.

(4-3)

In the abovementioned embodiment, the energy consumption amount-determining device 130 for determining the prescribed amount of energy consumption (allowed amount of energy consumption W2) before the adjustment period T1 ends is further provided. An upper limit of the amount of energy consumed (allowed amount of energy consumption W2) after the adjustment period T1 can thereby be determined in advance. Accordingly, the amenity of the properties A and B can be restored in a manner so that the amount of energy consumption does not suddenly increase after adjustment of the amount of energy consumption in accordance with the demand adjustment request.

(4-4)

In the abovementioned embodiment, the prescribed amount of energy consumption (allowed amount of energy consumption W2) can be determined on the basis of operating status information 143a, meter information 143b, and the like, related to the amount of energy consumption of each piece of mechanical equipment 41, 42, 43, . . . stored in the storage device 130. The amount of energy consumed after the adjustment period can thereby be understood as accurately as possible.

(4-5)

In the abovementioned embodiment, the amount of energy consumed after the adjustment period TI can be calculated as accurately as possible on the basis of the information (operating status information 143a, meter information 143b, and the like) related to the amount of energy consumption of each piece of mechanical equipment 41, 42, 43, . . . before the adjustment period T1.

(5) Modified Examples (5-1) Modified Example 1A

In the abovementioned embodiment, the energy control system 100 is configured with a plurality of devices, being equipped with the communication device 110, the control device 120, the energy consumption amount-determining device 130, and the storage device 140. However, in another embodiment, the energy control system 100 may be configured with one device combining into one device all of the functions of the communication device 110, control device 120, energy consumption amount-determining device 130, and storage device 140. Or, the number of devices configuring the energy control system 100, not being limited to four and/or one, may be suitably increased or decreased.

(5-2) Modified Example 1B

Figure 10:
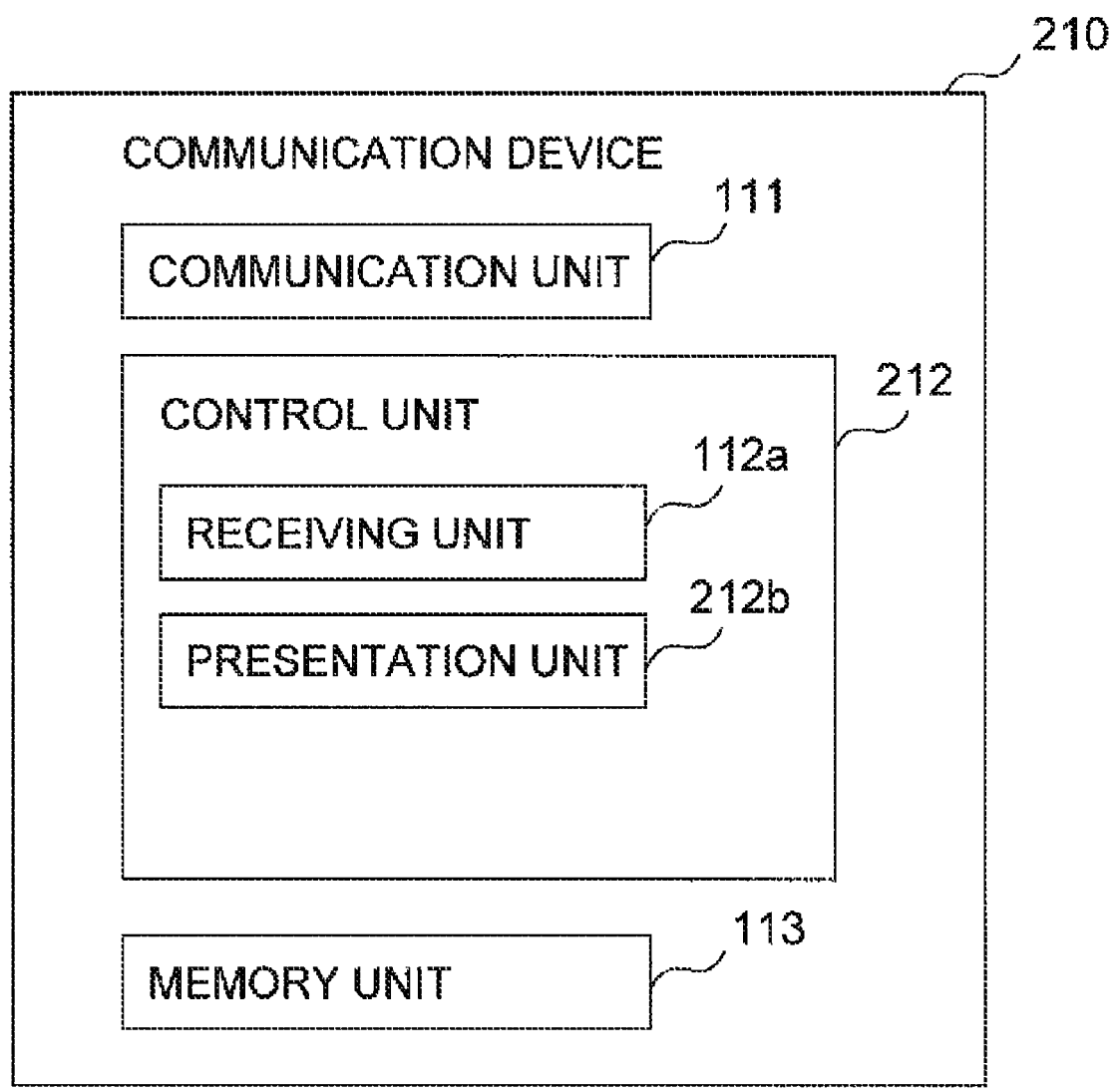
FIG. 10 is a general configuration diagram of the communication device according to modified example 1B.

In the abovementioned embodiment, the allowed amount of energy consumption W2 after the adjustment period T1 is determined by the energy consumption amount-determining device 130 before the end of the adjustment period T1. In another embodiment, the determined allowed amount of energy consumption W2 may additionally be presented to the power company. In this case, the communication device 110 is modified as the communication device 210 in FIG. 10. The difference between the communication device 110 and the communication device 210 is the presence or absence of a presentation unit 212b. The presentation unit 212b arranges for the communication unit 111 to transmit the allowed amount of energy consumption W2 to the energy management system 90 before the adjustment period T1 ends after being determined by the energy consumption amount-determining unit 132a. The power company can thereby understand the amount of energy consumption of the property A after the adjustment period T1, and can prepare countermeasures if there is a problem. For example, a demand adjustment request requesting suppression of the amount of energy consumption can be transmitted from the energy management system 90 of the power company to the energy control system 100 of the property A. Or, a demand adjustment request requesting suppression of the amount of energy consumption can be transmitted instead to the energy control system 100 of the property B or another property.

(5-3) Modified Example 1C

Figure 11:
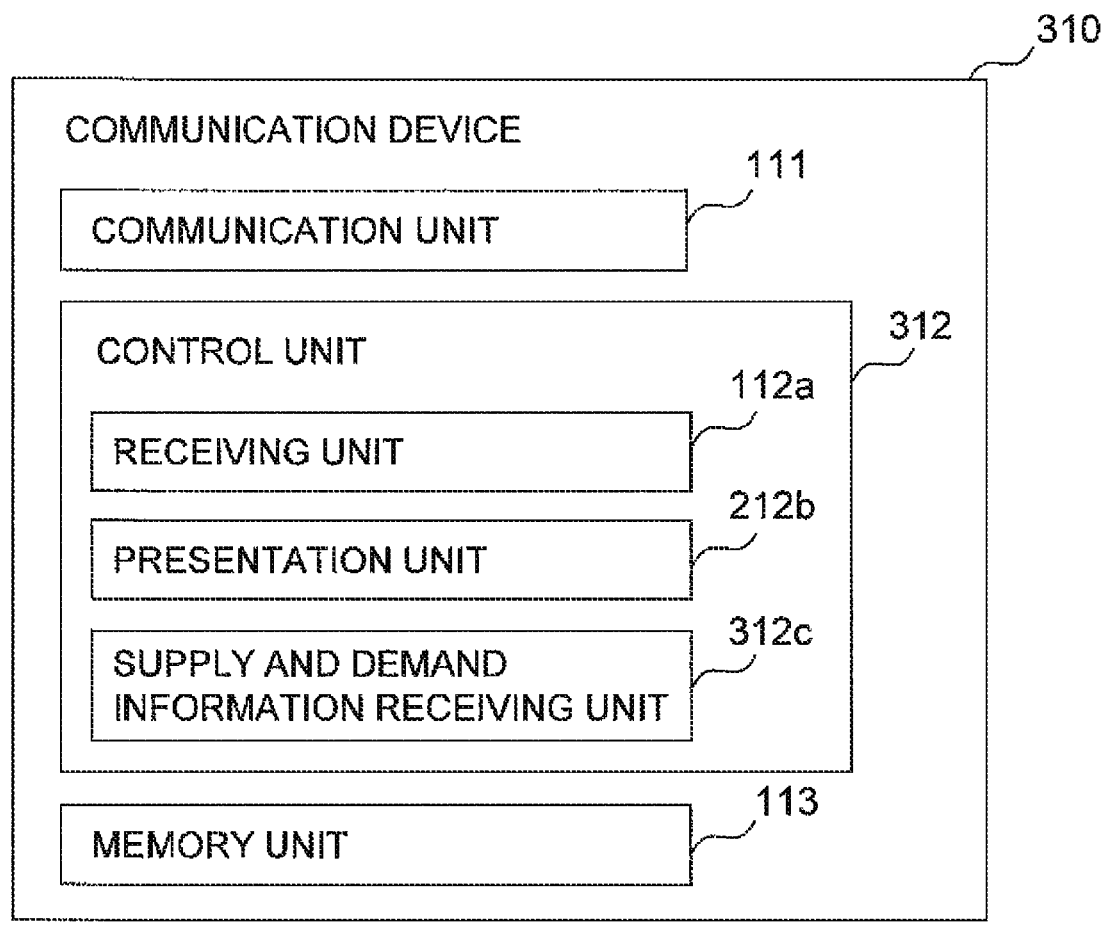
FIG. 11 is a general configuration diagram of the communication device according to modified example 1C.

In another embodiment, energy supply and demand information may be received from the power company, and the allowed amount of energy consumption W2 may furthermore be determined on the basis of the energy supply and demand information. In this case, the communication device 110 or the communication device 210 described above is modified as the communication device 310 in FIG. 11. The difference between the communication device 210 and the communication device 310 is the presence or absence of a supply and demand information receiving unit 312c.

The supply and demand information receiving unit 312c receives the energy supply and demand information when the communication device 310 receives the energy supply and demand information from the energy management system 90. That is, the communication device 310 arranges for the energy supply and demand information to be stored in the memory unit 113, and a message conveying that the energy supply and demand information has been received is transmitted together with the energy supply and demand information to the energy consumption amount-determining device 130. The communication device 310 receives the energy supply and demand information from the energy management system 90 before the end of the adjustment period T1.

When the communication unit 131 of the energy consumption amount-determining device 130 receives the abovementioned message and the energy supply and demand information, the energy consumption amount-determining unit 11 32a of the energy consumption amount-determining device 130 determines, for example, the allowed amount of energy consumption W2 of the entirety of the mechanical equipment 41, 42, 43, . . . of the property A after the adjustment period T1, on the basis of the energy supply and demand information in addition to the operating status information 143a, Specifically, for example, the energy consumption amount-determining unit 132a determines on the basis of the energy supply and demand information that there is a margin of energy supply over demand after the adjustment period, the energy consumption amount-determining unit 132a determines a value having increased by 30% the amount of energy consumption after the adjustment period T1, assuming that the first adjustment control calculated from the operating status information 143a was not performed, as the allowed amount of energy consumption W2. If the energy consumption amount-determining unit 132a determines that there is no margin of energy supply over demand after the adjustment period, the energy consumption amount-determining unit 132a determines a value having increased by 5% the amount of energy consumption after the adjustment period T1, assuming that the first adjustment control calculated from the operating status information 143a was not performed, as the allowed amount of energy consumption W2. Furthermore, the determined allowed amount of energy consumption W2 is transmitted by the presentation unit 212b of the communication device 310 via the communication unit 311 to the energy management system 90, at which time the power company can understand the determined allowed amount of energy consumption W2, and therefore the benefit is greater.

A more appropriate allowed amount of energy consumption W2 can thereby be determined on the basis of the energy supply and demand information.

(5-4) Modified Example 1D

In the abovementioned embodiment, the adjustment period T1 is a period indicated by a demand adjustment request from the energy management system 90. However, in another embodiment, the adjustment period T1 may be a period determined by the energy control system 100 In this case, for example, the first control unit 123a of the control device 120 takes a period stored in advance in the memory unit 124 as the adjustment period T1. Or, the adjustment period T1 may be determined on the basis of the operating status of the mechanical equipment 41, 42, 43, The first control unit 123a also may start the first adjustment control after a prescribed time elapses (for example, five minutes) after the demand adjustment request has been received by the receiving unit 112a from the energy management system 90, and may end the first adjustment control when the receiving unit 112a receives a signal giving notification of the end of the adjustment period T1 from the energy management system 90.

(5-5) Modified Example 1E

In the abovementioned embodiment, the energy control system 100 performs control (first adjustment control) to suppress the amount of energy consumption of the entirety of the mechanical equipment 41, 42, 43, . . . when a demand adjustment request is transmitted from the energy management system 90. However, in another embodiment, the energy control system 100 may perform control (first adjustment control) to suppress the amount of energy consumption of the entirety of the mechanical equipment 41, 42, 43, . . . autonomously in order to respond to variation in unit energy cost, increase of the amount of energy consumption, or another event. Or, the energy control system may perform the first adjustment control in order to respond to all events including a demand adjustment request, variation in unit energy cost, and increase of the amount of energy consumption, or in order to respond to at least one of these events.

For example, when the unit energy cost during daytime (for example, from 1:00 p.m. to 3:00 p.m.) when energy supply and demand is pressing is set comparatively higher than during other time periods, the control device 120 performs control to suppress the amount of energy consumed by the mechanical equipment 41, 42, 43, . . . during a prescribed time period (adjustment period T1) in a time period during the daytime in order to respond to cost variation in the unit energy cost. That is, the first control unit 123a performs the first adjustment control. In this case, the receiving unit 112a receives information related to the unit energy cost transmitted from the power company.

Also for example, the first adjustment control may be performed for a prescribed period (adjustment period T1) when the amount of energy consumption of the entirety of the mechanical equipment 41, 42, 43, . . . greatly increases exceeding a prescribed range regardless of the presence or absence of variation in unit energy cost according to time period. If second adjustment control is performed after the end of the first adjustment control, that is, after the end of the adjustment period T1 and a sudden increase of the amount of energy consumption of the entirety of the mechanical equipment 41, 42, 43, . . . is suppressed, a situation in which the energy supply and demand becomes pressing for a time immediately after the adjustment period T1 and other problems can be suppressed.

What is claimed is:

1. An energy control system, comprising:
an energy control device adapted to adjust an amount of energy consumed by mechanical equipment placed at a property;
a communication device having a receiving unit configured to receive a demand adjustment request from an energy supply company; and
a storage device configured to store information related to the amount of energy consumed by the mechanical equipment,
the communication device being configured to forward the demand adjustment request to the energy control device, and
the energy control device including
a first control unit configured to execute a first adjustment control during a prescribed adjustment period, the first adjustment control adjusting an amount of energy consumed by the mechanical equipment, the amount of energy consumed by the mechanical equipment being adjusted in accordance with a first upper limit amount of energy consumption which achieves the demand adjustment request from the energy supply company in the first adjustment control, and
a second control unit configured to execute a second adjustment control separate from the first adjustment control during a non-adjustment period after the adjustment period, the amount of energy consumed by the mechanical equipment being adjusted not to exceed a second upper limit amount of energy consumption, which is higher than the first upper limit amount of energy consumption, in second adjustment control,
the second upper limit amount of energy consumption being determined based on an amount of energy consumed by the mechanical equipment before the adjustment period, and the second upper limit amount of energy consumption being determined based on the information stored by the storage device.

2. The energy control system according to claim 1, further comprising:

an energy consumption amount-determining device configured to determine the second upper limit amount of energy consumption before the adjustment period ends.

3. The energy control system according to claim 2, wherein the communication device further has a presentation unit configured to present the second upper limit amount of energy consumption to a higher-level energy management system.

4. The energy control system according to claim 3, wherein the energy consumption amount-determining device determines the second upper limit amount of energy consumption based on the amount of energy consumed by the mechanical equipment before the adjustment period.

5. The energy control system according to claim 3, wherein the communication device further has a supply and demand information receiving unit configured to receive energy supply and demand information from the higher-level energy management system, and the energy consumption amount-determining device determines the second upper limit amount of energy consumption based on the energy supply and demand information.

6. The energy control system according to claim 2, wherein the energy consumption amount-determining device determines the second upper limit amount of energy consumption based on the amount of energy consumed by the mechanical equipment before the adjustment period.

7. The energy control system according to claim 2, wherein the communication device further has a supply and demand information receiving unit configured to receive energy supply and demand information from the higher-level energy management system, and the energy consumption amount-determining device determines the second upper limit amount of energy consumption based on the energy supply and demand information.

* * * * *